United States Patent
Narang et al.

(10) Patent No.: US 9,568,331 B1
(45) Date of Patent: Feb. 14, 2017

(54) PREDICTIVE TRAVEL PLANNING SYSTEM

(71) Applicants: Radhika Narang, San Jose, CA (US); Rahul Agarwal, San Jose, CA (US)

(72) Inventors: Radhika Narang, San Jose, CA (US); Rahul Agarwal, San Jose, CA (US)

( * ) Notice: Subject to any disclaimer, the term of this patent is extended or adjusted under 35 U.S.C. 154(b) by 0 days.

(21) Appl. No.: 14/214,843

(22) Filed: Mar. 15, 2014

Related U.S. Application Data (60) Provisional application No. 61/801,341, filed on Mar. 15, 2013.

(51) Int. Cl.
*G01C 21/00* (2006.01)
*G01C 21/36* (2006.01)

(52) U.S. Cl.
CPC ....... *G01C 21/3617* (2013.01); *G01C 21/3679* (2013.01); *G01C 21/3694* (2013.01)

(58) Field of Classification Search
CPC . G01C 21/3492; G01C 21/3691; G01C 21/34; G01C 21/3407; G01C 21/3617
USPC ... 701/423, 426, 438; 340/995.14 M, 995.19
See application file for complete search history.

(56) References Cited

U.S. PATENT DOCUMENTS

| | | | |
|---|---|---|---|
| 2007/0073477 A1* | 3/2007 | Krumm et al. | 701/209 |
| 2012/0084248 A1* | 4/2012 | Gavrilescu | 706/52 |
| 2012/0253661 A1* | 10/2012 | Tuukkanen | 701/423 |
| 2013/0122937 A1* | 5/2013 | Meyer et al. | 455/456.3 |
| 2014/0249747 A1* | 9/2014 | Kosseifi et al. | 701/428 |
| 2014/0343838 A1* | 11/2014 | Ahn et al. | 701/423 |

* cited by examiner

*Primary Examiner* — Marthe Marc-Coleman
(74) *Attorney, Agent, or Firm* — Erik Vieira (57) ABSTRACT

A novel predictive travel planning system is disclosed for gathering a user intention, interactively interacting with the user to create a travel plan, supporting the user's execution of the trip on a real-time basis during travel, allowing the user to share his/her experiences with others and learning from the user's experiences. The system can use a variety of computing devices to gather information before and during travel, such as for example a desktop computer, a tablet computer, or a smart phone.

14 Claims, 7 Drawing Sheets

PREDICTIVE TRAVEL PLANNING SYSTEM

BACKGROUND

Cross-Reference to Related Applications

This non-provisional patent application claims a benefit of priority to previously filed U.S. provisional patent application No. 61/801,341 filed Mar. 15, 2013 to Narang, et al., entitled A PREDICTIVE TRAVEL PLANNING SYSTEM. The afore-mentioned provisional patent application is hereby incorporated by reference in its entirety as if disclosed herein in full.

BRIEF DESCRIPTION OF THE DRAWINGS

Embodiments of the present disclosure will be more readily understood by reference to the following figures, in which like reference numbers and designations indicate like elements.

DETAILED DESCRIPTION

This invention applies to road-travel planning. Its intelligence enables users to find places of interest and plan routes for their road travel efficiently. Technologies present today are able to do the following successfully:
1. Provide a route to the user to get from the source to the destination through some intermediate points of interest.
2. Allow a user to search for points of interest per his/her needs surrounding a location, and tell whether they're open for business at the time of search, or at a later time.
3. Re-route the user in case he/she veers off-route to destination.
4. Present traffic information to the user and account for it in the travel duration estimation.
5. Provide information regarding public transport facilities and walking/cycling directions.
6. Provide satellite imagery of the world, down to the view from the street.
7. Find points of interest along a route.
8. Allow users to save a list of favorite locations.
9. Allow users to search within a user specified region.

Technology present today has the following limitations:
1. They don't automatically determine or dynamically adjust the point of interest search area per the motion and position of the user.
2. They require a final destination to search for points of interest along the currently used street.
3. They unintelligently aggregate and present the information required for road-travel planning to the user. This leads to a bad user experience, as the user has to filter through the data manually for it to make sense.
4. They don't account for the user's and the crowd's preferences when presenting points of interest for the user to consider.
5. They don't account for volatile events when searching for points of interest, including but not limited to festivals, parades, etc.
6. They don't account for eliminating factors when presenting users with choices for points of interest, including but not limited to time of day, point of interest hours of operation, budget, traffic, user interests, crowd based reviews, pets, etc.
7. They don't account for the readability of the points of interest when presented to the user.
8. They don't account for the difference in implied user scenario when the user is utilizing a specific type of device to access the travel planning service, including but not limited to phones, tablets, watches, desktop computers, laptop computers, etc. They also don't account for the correlation between the motion of the device and the type of road-travel—planned vs. real-time.
9. They don't suggest alternative points of interest in the event of an adverse incident that causes a disruption the trip itinerary, including but not limited to accidents, flat tires, vehicular break-downs, health emergencies, etc.
10. They don't detect conditions that could imply the user is in need of assistance (like stopped on a highway when not much traffic, etc.) to suggest contacting their individual roadside assistance service or emergency response services.
11. They don't enable emergency response services to communicate with them a path to a distress site in order to allow the technology to determine and subsequently alert the user that they may be in the path of an emergency responder and possibly reroute him/her away from it while the emergency responder is in transit.
12. They don't alert the user with necessary and relevant information, including but not limited to news alerts, accident alerts, speed limit changes, etc.
13. They don't use prediction algorithms on a real-time basis to determine a user's need during the travel (based on duration of non-stop driving, temperature, terrain, number of drivers, etc.), including but not limited to food, gas, rest, etc.
14. They don't use prediction algorithms and available user data at a trip planning time to predict points of interest around the right location (based on travel time accounting for traffic, etc.), including but not limited to hotels to rest for the night, etc.
15. They don't use prediction algorithms and available user data in order to predict savings opportunities for a user during travel including, but not limited to fuel prices, deals, Hotel prices, etc.
16. They don't provide a "most efficient route" to the user when the destination is known and the intermediate points of interest are chosen for the trip.
17. They don't allow for multiple users (including ones not traveling) to be a part of a single trip plan in order to allow adult oversight and/or individually coordinate groups of travelers, including but not limited to managing their routes independently, allowing for communication of members' locations, accounting for costs, etc.
18. They don't provide suggestions for entertainment, including but not limited to allowing searching for frequencies of their favorite radio stations/genres in their current location, providing a travel-game reference, etc.
19. They don't provide a medium to promptly obtain the users' feedback from an activity with an efficient, minimally invasive user interface.
20. They don't provide a medium for the user to capture and share their experiences from the road-travel in a contextually and geographically aware manner.
21. They don't learn from their users' experiences in order to improve their points of interest suggestions.
22. They don't provide a seamlessly integrated road-travel planning service that minimizes the user's effort in planning a road trip, including but not limited to creating a checklist of items to pack for the road trip, booking hotels, rental cars, etc.
23. They don't account for special needs of some of the members in the trip, including but not limited to disabled members, small children, pets, etc.
24. They don't provide a possibility to plan an entire trip with a single touch of a real/virtual button.
25. They don't account for external conditions that the users might encounter, such as bad roads, public transportation conditions, etc. when routing the user
26. They don't provide a mechanism to assimilate information about the conditions of the roadways, public transportation system, etc. in a non-invasive manner.
27. They don't account for the real accessibility of the point of interest when filtering results after searching around a location.
28. They don't do predictive and smart route-caching in order to be able to route the user even if the user loses access to the app's server/routing engine.

Road-travel has evolved to be a necessity for most of us, yet the tools that we use to guide us through these travel experiences haven't evolved at the same rate. The development of search, navigation, GPS, computing (mobile and non-mobile) technologies allows us to access the information we need to make this experience pleasurable, but it does so in a piecemeal method and requires a lot of work from the user. This invention describes new methods of using the technology we have at our disposal to create a seamless, effortless and pleasurable road travel experience.

Figure 1:
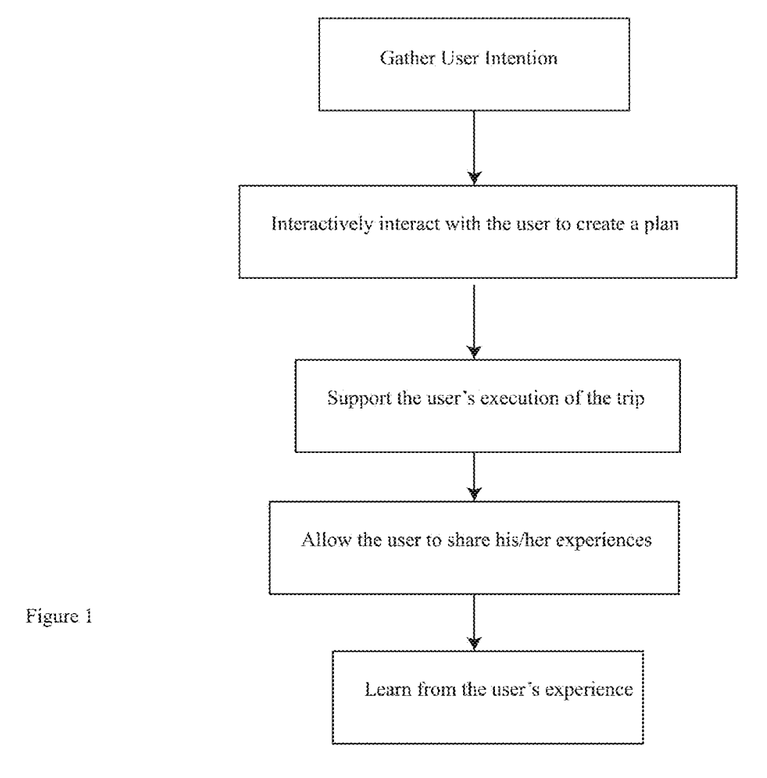
FIG. 1 illustrates method according to one embodiment of the present teachings.

From the point of view of a tool used for travel planning and execution, the steps could be broken down into five stages—gather user intention, iteratively interact with the user to create a plan, support the user's execution of the trip, allow the user to share his/her experiences, learn from the user's experience. This process is illustrated by the flowchart (FIG. 1):

FIG. 1: A Travel planning and execution software's five stages

Gather User Intent

Users provide data in both explicit and implicit forms. In order to plan and execute a trip efficiently with good user experience, it is important to capture not only the explicit input from the user, but also the implicit hints that the user provides. However, the first step of any travel planning requires understanding where the user would like to go. This point of interest could be the user's final destination or a waypoint en route to his/her final destination.

Figure 2:
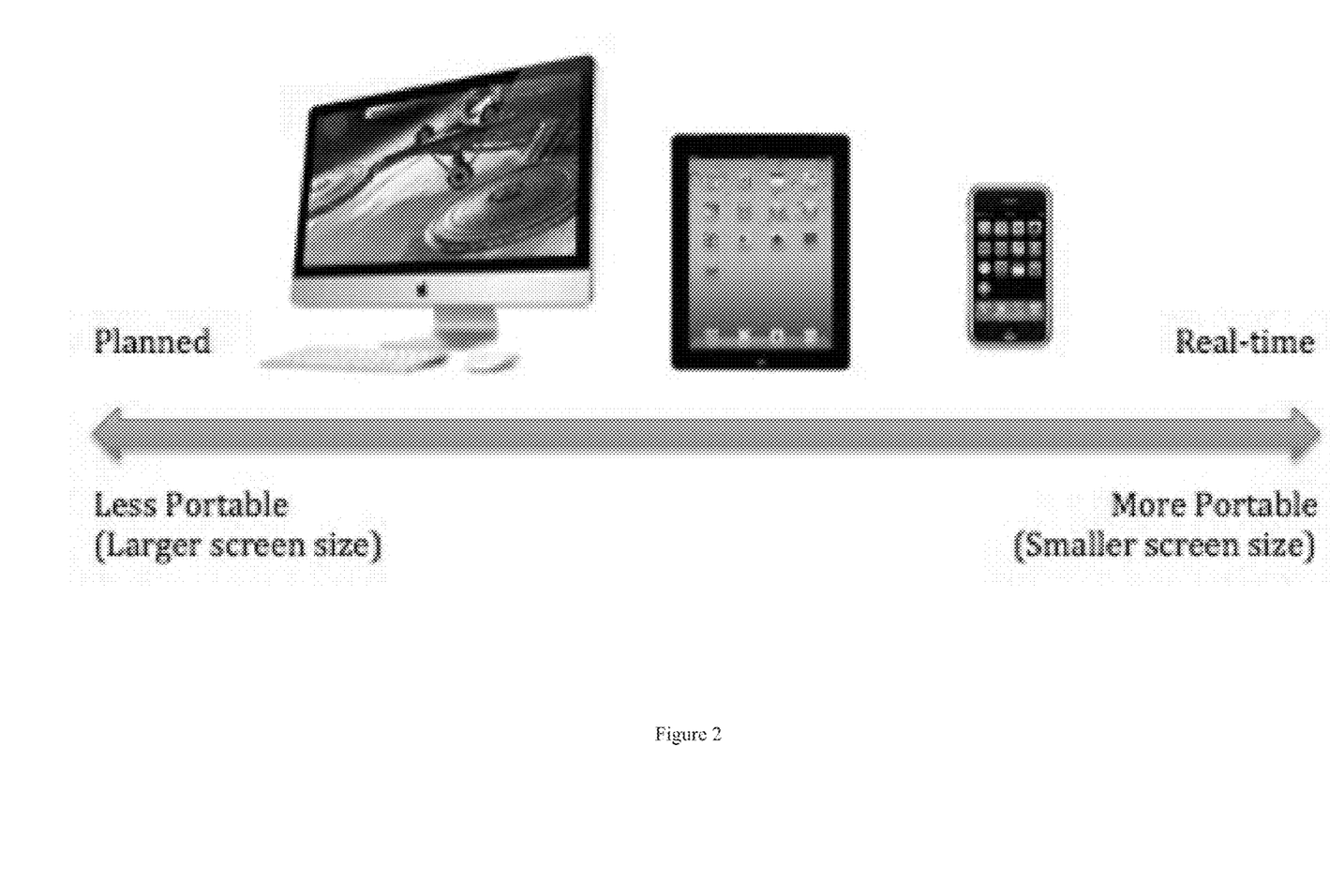
FIG. 2 illustrates computing input devices according to one embodiment of the present teachings.

FIG. 2: Device portability and likelihood of real-time nature of road travel

Scenarios that require a search for points of interest can be broadly classified into two categories—planning and real-time. In the planning scenario the user has the luxury of a larger number of interactions with the software in order to plan the trip. In this scenario the user could choose many points of interest and plan an elaborate route. The real-time scenario is one where the user needs to find an appropriate point of interest immediately, with extremely limited interactions. In this scenario, the user is usually looking for a necessary detour from his/her current route for something that cannot wait for too long, such as gas, food, etc. The device used in order to find points of interest can provide useful information to estimate the intent of the user (8). For instance, if the device is a desktop computer, the user is probably trying to plan a road travel and search for points of interest in advance. On the other hand, if the device is a smartphone, the user probably intends to do a real-time search for points of interest. It can thus be assumed that lesser portable the device, consequently with a larger screen real-estate, the more likely that the user is trying to find points of interest with the intention of planning the travel in advance and vice-versa, as illustrated in FIG. 2 above. This rule could be used to guide the User Interface design of the road travel planning software running on the device. For instance, both a real-time mode of operation and a planning mode of operation could be made available to the user in the software for each of these form-factors.

However, the default mode being selected would depend on the form-factor, with an option to easily switch to the non-default mode, if need be. If the example of the desktop computer is examined from the "less portable" group, a suitable default mode for the software to operate in would be the planning mode. However, if a tablet is chosen, which has the screen real estate to easily plan the travel and also allows for portability, more data would be needed to decide the default. Meanwhile, if a smartphone is used, the default mode should most likely be the real-time mode of operation.

If the user is using a mobile device, such as a smartphone, tablet, etc., speed, direction of travel and the current street being occupied are great indicators of the user's intention. For instance, if a mobile device (tablet, phone, etc.) user is not in motion or is in motion at negligible speeds, it can be assumed that the user is safely able to plan a trip. In such a scenario, the default exposed to the user could be the planning mode. However, if the user is traveling at a significant speed (at levels where it can be safely assumed the user is in a vehicle), it is likely that they're looking for 1) general points of interest along the street they're currently occupying, or 2) specific points of interest. It is unlikely that the user will try to plan an elaborate trip while traveling in a vehicle. Hence, the most likely default mode exposed to the user should be the real-time mode. Table 1 below specifies appropriate defaults for various device form factors, which could be running different compatible flavors of the road travel planning and execution software.

TABLE 1

Appropriate defaults for software running on different device sizes

| | Default Mode of operation | |
|---|---|---|
| | Stationary | Moving |
| Desktop Computer | Planning Mode | N/A |
| Tablet | Planning Mode | Real-time |
| Smartphone | Planning Mode | Real-time |

Note that such software would generally run in client-server model, where the server does most of the heavy lifting in terms of the calculations, data processing, etc. and the client would generally be the medium to present the information to the user. The server would have an engine that does the processing, and would have a database in order to store any information that would be needed, such as user preferences, places of interest, etc. It is likely that the client would be specific to the device that it is designed for, while the server would be device independent. All of the data needed for this invention is either already available in a usable format through a third party today, or can be gathered via the means specified in the invention and stored in the above mentioned database.

Iteratively Interact with the User to Create a Plan

Finding Points of Interest:

Planning and real-time modes have several user interface and software programming differences, but the single most important difference between the two is that planning mode would always require a final destination, which would likely be its first user input, while real-time mode would almost never require a final destination.

The real-time mode could allow a user to find a point of interest without specifying a destination (2). Through the implicit user input of GPS location samples, the user's speed, currently occupied street and direction of travel could be determined using usual reverse-geocoding mechanisms. This information could be used to automatically determine an area of interest, which could be circular, oval, or rectangular, etc. The position and size of this area of interest would depend upon the speed with which the user is moving with the device (1). The faster the user moves, the further this area would be from the user at the time of search. However, the center of this area would always be on the street that the user is currently occupying and in the direction the user is headed on this street. For this reason, the real-time mode can also be referred to as the "Spotlight Mode". This method of calculating area of interest allows for the points of interest to be always convenient (never behind the user) and takes into account the time a user needs to maneuver (change lanes on a highway, etc.) to be able to access the route to the location. There are a couple ways in which this area of interest determination can be done according to speed—as a gradient or in discrete levels. In the gradient case, every increment or decrement of the user's speed would result in a shift of the center of search. For instance, let's take a "multiplier" of 0.02 miles/mph and let's assume the range of speeds we are accounting for is 20 mph to 140 mph. Also, let's assume that the minimum distance to the area of interest center (at 20 mph) is 1.2 miles with a width of 1 mile (so 0.2 miles-2.2 miles away from the user following the contour of the route). In this case, at 140 mph, the center of the area of interest would be 3.6 miles away, with a range of 2.6 miles-4.6 miles from the user following the contour of the route. Table 2 below outlines samples taken at every 20 mph increment with this method.

TABLE 2

Area of interest samples at every 20 mph increment as calculated by the gradient method Area of interest properties (0.02 miles/mph multiplier)

| Speed of user | Center (distance from user) | Range (distance from user) |
|---|---|---|
| 20 mph | 1.2 miles | 0.2 miles-2.2 miles |
| 40 mph | 1.6 miles | 0.6 miles-2.6 miles |
| 60 mph | 2.0 miles | 1.0 miles-3.0 miles |
| 80 mph | 2.4 miles | 1.4 miles-3.4 miles |
| 100 mph | 2.8 miles | 1.8 miles-3.8 miles |
| 120 mph | 3.2 miles | 2.2 miles-4.2 miles |
| 140 mph | 3.6 miles | 2.6 miles-4.6 miles |

In the discrete level calculation, various thresholds could be determined and associated with preset area of interest properties. For instance, if the user is moving between a speed of 20 and 60 mph, the area of interest center could be 1.2 miles away, from 61 to 100 mph, 2 miles away and so on. Table 3 below shows an example of area of interest determination using the discrete level method.

TABLE 2

Area of interest properties example using discrete level method

Area of interest properties (0.02 miles/mph multiplier)

| Speed of user | Center (distance from user) | Range (distance from user) |
|---|---|---|
| 20 mph-60 mph | 1.2 miles | 0.2 miles-2.2 miles |
| 61 mph-100 mph | 2.0 miles | 1.0 miles-3.0 miles |
| 100 mph-140 mph | 2.8 miles | 1.8 miles-3.8 miles |

2.

Note that the above numbers are for illustration purposes only and could be tweaked in any implementation as desired. Also, note that the above method assumes that the programmer has access to polyline data (which is openly available) for the road that the user is occupying, which allows him/her to follow the road's contour when marking out the area of interest.

As the departure information and the area of interest are automatically determined, the user would only have to explicitly specify the category for the point of interest, such as gas stations, restaurants, hospitals, etc., or a name of a specific point of interest (E.g. Wendy's). Using this information, the software could query its database of places or a use a pre-existing service for the relevant points of interest in the area of interest, process the results and display them to the user in an aesthetic and readable form. The software could adjust the size of the area of interest depending on the number of results, i.e. make it smaller if there are too many results and make it larger (in the direction of the user's travel) if there are too few. The user could then select one of the results and the software would calculate the directions to this point of interest using Dijkstra's algorithm (or other similar routing algorithms) or use the help of a pre-existing service to do so.

Note that a "single-click search" for a point of interest of locations such as gas stations can be implemented through the above mechanism. In such a search, based on a single click from the user on a button indicating the category of the place (restaurant, gas station, etc.), the software could go ahead and find a place that is within the area of interest as determined above and matches the user's preferences (like gas brand, or cuisines) or his/her history.

Figure 4:
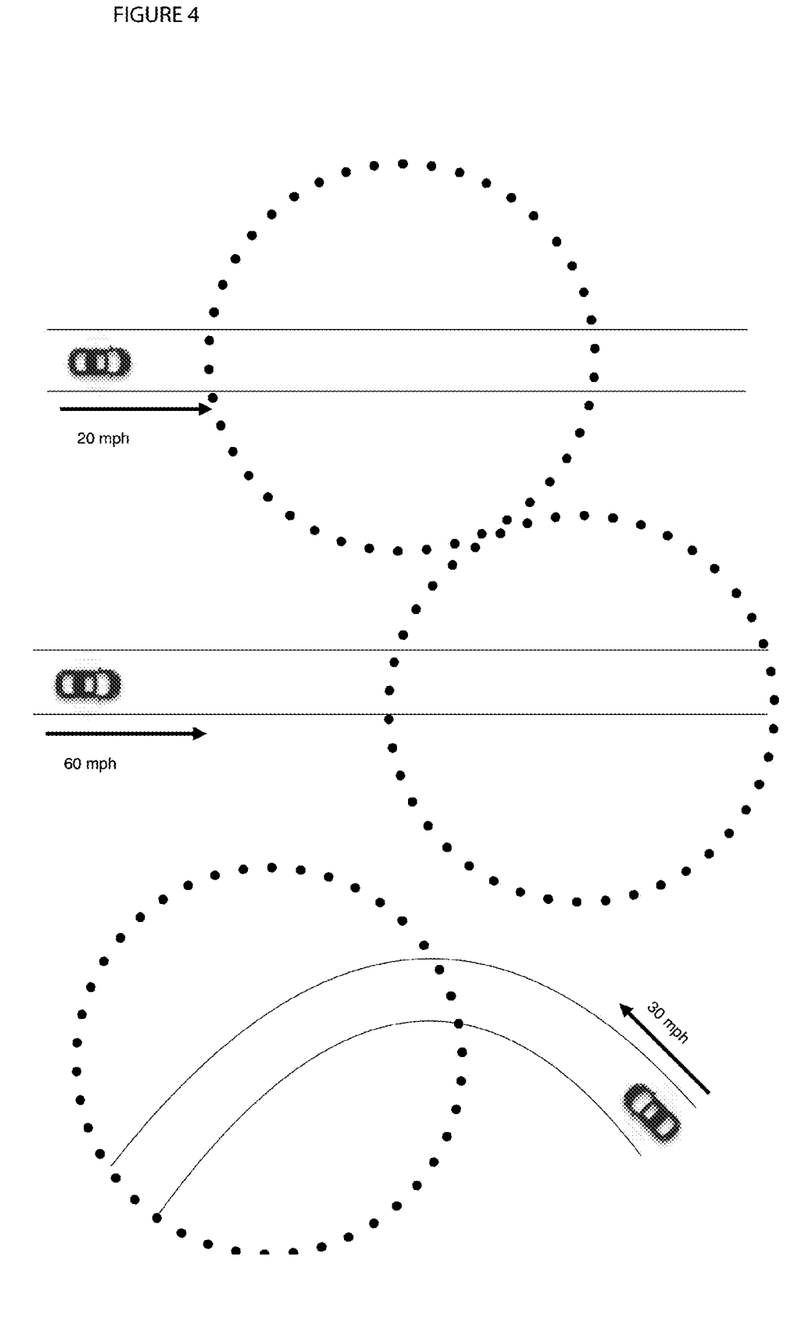
FIG. 4 illustrates areas of interest based on parameters, according to one embodiment of the present teachings.
Figure 5:
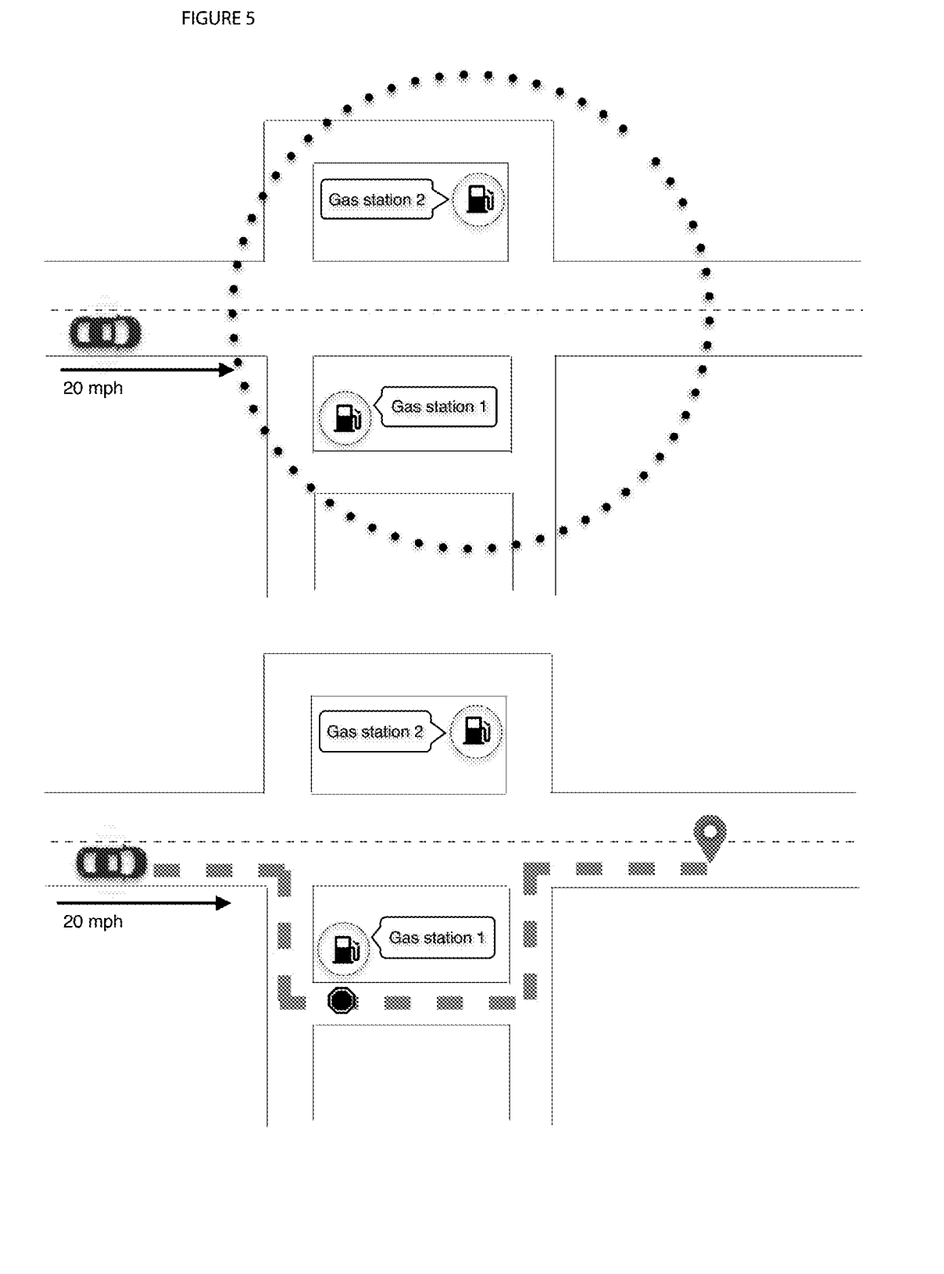
FIG. 5 illustrates a routing system, according to one embodiment of the present teachings.
Figure 6:
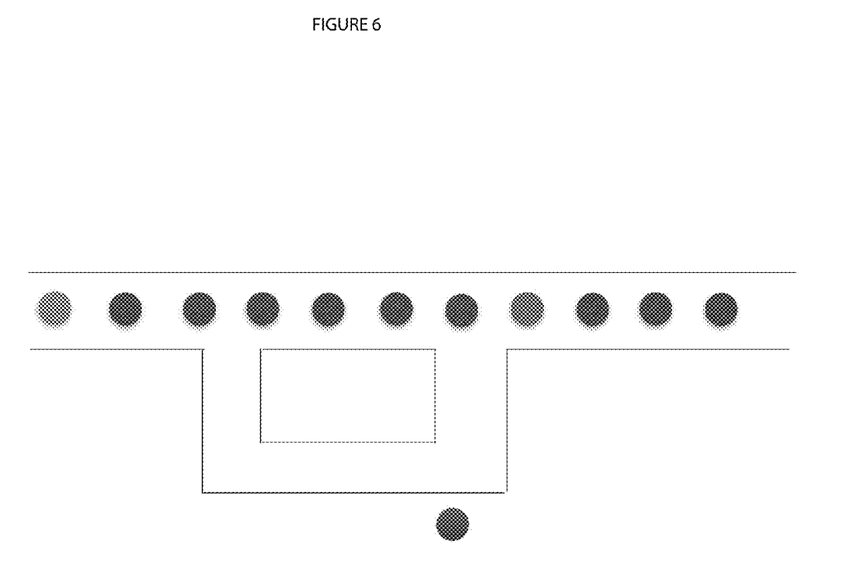
FIG. 6 illustrates an alternative routing system, according to one embodiment of the present teachings.
Figure 7:
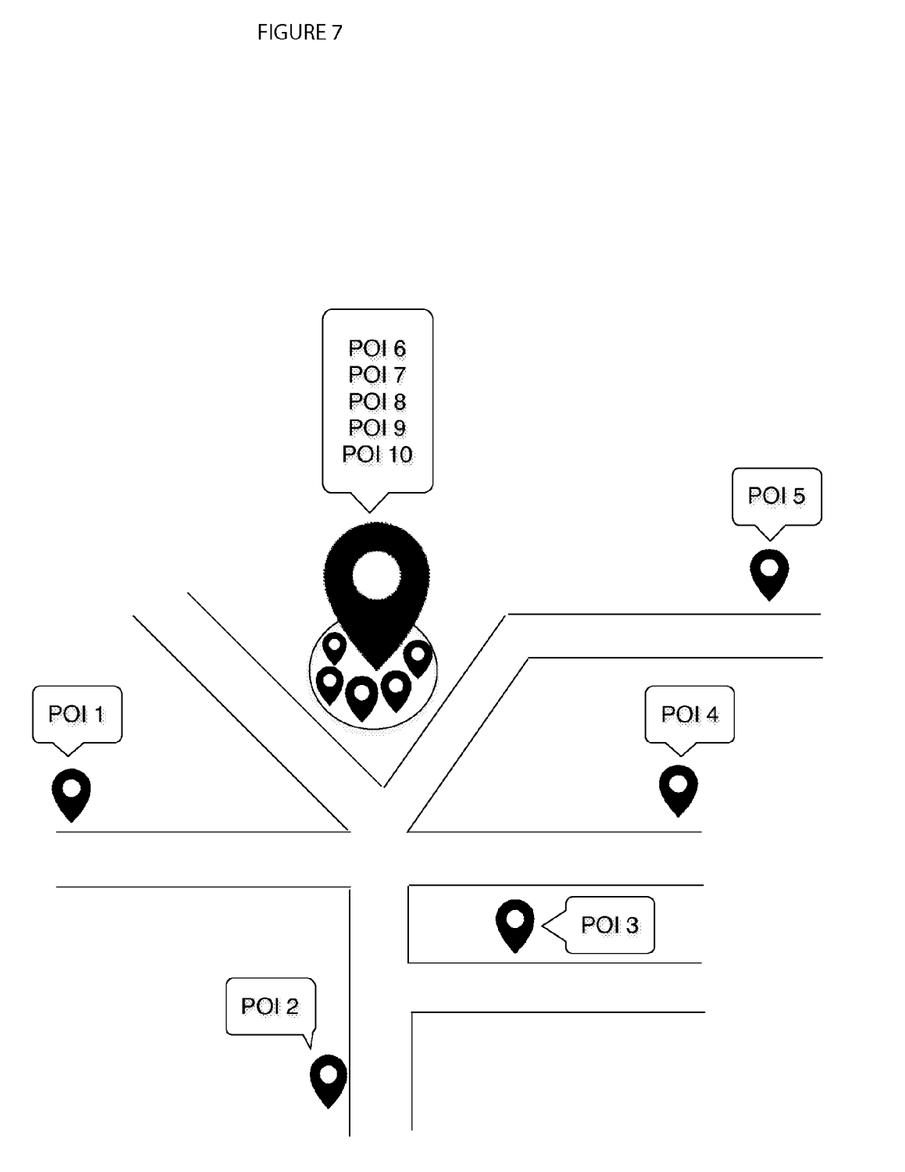
FIG. 7 illustrates consolidation of clustered points of interest, according to one embodiment of the present teachings.

Once the user has reached this location, the software could give the user a few options for the next step—1) Go back to the point where the user started from; 2) Go further along the user's original street, i.e. the shortest way to get back on the original road, further along in the original direction of the user's travel, or 3) To a new destination. Options 1 and 3 are point to point direction calculations which can be done using Dijkstra's algorithm (or other similar routing algorithms) or use the help of a pre-existing service to do so. For option 2, the software would need to find a suitable point further along the original road that is closest to the user's current location. This can be done by sampling the polyline of the original road, starting from where the user searched for points of interest in the original direction of travel, and calculating the shortest distance (using Dijkstra's algorithm or a suitable variant) from the user's current location to each of these samples. The point with the shortest distance among all would be the one that the software would route the user to. FIGS. 4, 5 and 6 below show examples of area of interest movement, and illustrate the route calculation from the route to the point of interest and back to the route.

Figure 3:
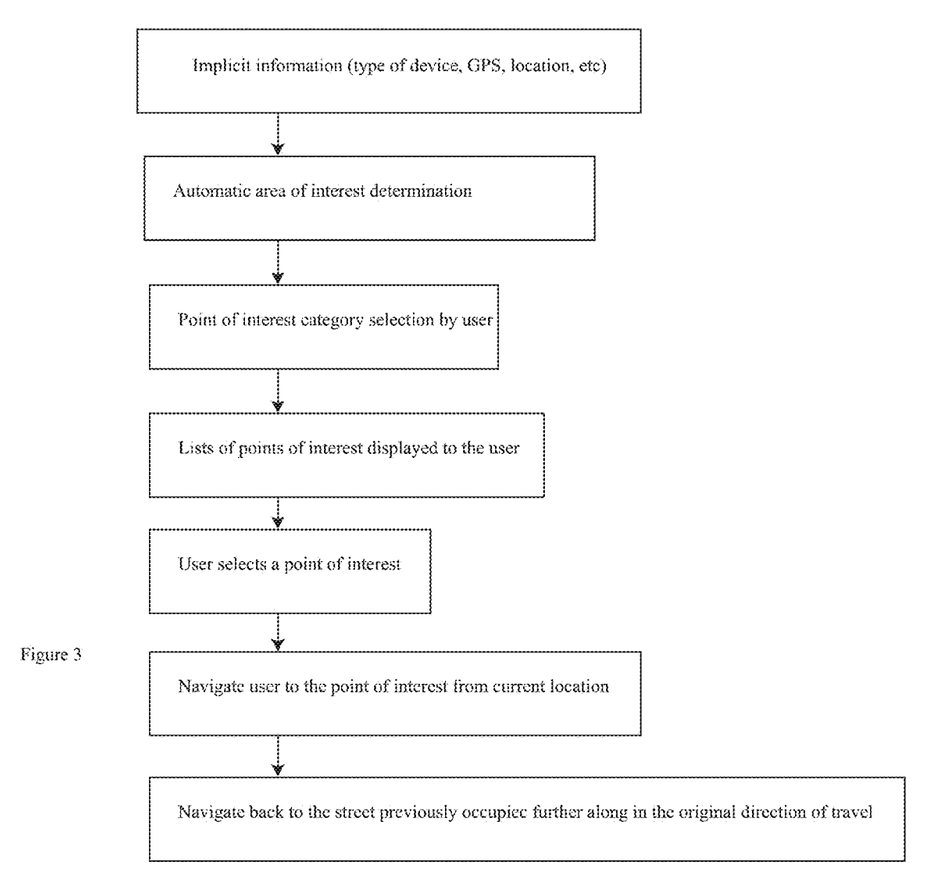
FIG. 3 illustrates a method according to one embodiment of the present teachings.

FIG. 3: Stages involved in real-time mode

FIG. 4: Areas of interest based on speed, location and direction of travel on route of travel FIG. 5: Illustration of routing away from route for a point of interest and then back to the road by assuming a "destination" in the real-time mode.

FIG. 6: Illustration of sampling points (black circles) on the original road from the user's original start point (green circle). Shortest distance from the user's current location (red circle) would be the closest point (blue circle) to get back on the original road in the same direction.

Planning mode can be split into two, and these could have
1 Planning a Long trip
2. Planning a Short trip Depending upon the user's start and end location, it could be determined whether the user is planning a short trip or a long trip. A short trip would be one that doesn't necessitate any additional assistance to the user in deciding points of interest. In other words, a query for points of interest in a short trip would only result in a manageable number of results. For instance, driving from San Jose, Calif. to San Francisco, Calif. would qualify as a short trip. The user could still add multiple intermediate stops and create an elaborate trip, but he/she wouldn't have to think about things like a hotel for the night. In a long trip, the user generally would need assistance, as the number of results returned would be large. An example for a long trip would be a drive from San Jose, Calif. to Austin, Tex. In such a trip, the user would need to know at what point to book hotels, which are the areas he/she would be reaching at lunch or dinner time and which restaurants in these areas are worth dining at. Both the planning modes could enable users to search and book rental cars near the source of the trip.

In the short trip planning mode, the user interface flow could be something like this:
1. User enters final destination, and adds it to the trip
2. User enters a point of interest name/category to search along the route to the destination within a certain (adjustable) area around the route (area of interest for planning mode)
3. The software searches its database or uses a pre-existing service to query points of interest in this area of interest.
4. The software then processes these results and presents them to the user in a readable format.
5. The user makes a selection for the point of interest and adds it to the trip, or makes it a new source/destination.
6. Based on the section of the trip the point of interest lies, the software orders the point of interest to initially provide the most efficient route. If there is more than one point of interest in a single section, the user selection order is used to determine which location the user should visit first. (16)
7. Repeat steps 2-6 as many times as needed.
8. User indicates he/she has finished planning
9. The software presents the user with an itinerary/plan that orders the points of interest to determine the most efficient route, using any existing solutions for the traveling salesman problem, such as an ant colony optimizations or branch and bound based algorithms, etc. An option is presented to the user to align the choice of points of interest with the user selection order if this route is not preferable to him/her, or to manually order them. If the user decides to order the points manually or to stick with his/her originally chosen order, the software would just have to calculate the shortest distance between each of the consecutive points using existing shortest distance algorithms such as Dijkstra's algorithm or a suitable variant. This itinerary/plan could also contain useful supplementary information, such as the cost of fuel through the trip, or the total time spent driving, etc.

For instance, the user wants to plan a trip from San Jose, Calif. (current location of user) to San Francisco, Calif., which is about a 45 minute long (about 40 miles) journey northwards. The following is a perceived chain of events to plan this trip:
1. The user would first enter the final destination as, say pier 39.
2. The user enters "Ripley's Believe it or not" as the name of the point of interest.
3. The software finds this location and determines that it is located near San Francisco.
4. The user enters a point of interest category, say gas.
5. The software finds multiple gas stations along the route and the user chooses a gas station in San Jose.
6. The user enters a point of interest, say drug stores.
7. The software finds multiple drug stores along the route and the user chooses a drug store in San Jose.
8. The user indicates he/she has finished planning
9. The software calculates the most efficient route by deciding the following order. The user is given an option to use this order, or the order in which the points were chosen, or to reorder them per the user's preference:
   a. Source (current location of user)
   b. Gas station, San Jose
   c. Drug Store, San Jose
   d. Ripley's believe it or not, San Francisco
   e. Pier 39, San Francisco
10. Once the user makes a choice, an itinerary is presented to the user.

In the long trip planning mode, similar steps as the short trip planning mode are followed. The only difference is that since the trip is much longer, the software recognizes that the user would need more assistance with planning it and could redirect him/her to a more extensive input form, including but not limited to requests of data such as date and time of departure, number of drivers, total time to complete trip, etc. Once the user enters the final destination, the software could mark out various zones of interest on the map for the user, such as meal zones, lodging zones, etc., along the route from the source to the destination. The software would calculate the route for the user from the source to the destination using Dijkstra's algorithm, a suitable variant or a pre-existing service provider. Since it would know the user's departure time/date as entered in the form provided to him/her, its server would have the information regarding the whereabouts of the user during the trip. Using this information, the software could determine where the user would be during meal times, like 11 AM-2 PM for lunch, and could mark the area around that section of the route as a meal zone, which could be adjusted by the user through the provided user interface. Restaurant searches could be filtered to be present within the meal zones, making it much easier for a user to significantly narrow down his/her options for food. Note that as the trip evolves with the addition of more via points, the route would change and as a result, the various zones could move around a bit. Similarly, other zones such as lodging zones for hotels, etc. could be marked. (14)

Gas zones could also be automatically determined if the software has the knowledge about the user's car. It could look up a third party database or maintain its own database of gas mileages and the distances that cars can travel on a full tank of gas. For instance, if a user is driving a Toyota Corolla, which can go approximately 300 miles on a full tank of gas, the software could take this into account and mark gas zones at every interval of 230-280 miles on the user's route and limit the gas station searches to those locations (14). Also, based on data obtained from user reviews, etc. (either in the software's own database or from a pre-existing service) and the user's preferences and history (i.e. if he/she has already traveled to this location, whether they liked it, etc.), tourist attraction spots could be suggested to the user (4). Moreover, if there are deals/savings opportunities available for the user to take advantage of through the software, these could be displayed to the user in conjunction with the points of interest with a distinctive factor (like a dollar sign appended to the sign for the location) (15). Additionally, there could be volatile events/sights of interest, i.e. events/points of interest that are accessible only for a short period of time such as the "Running of the bulls" while the user is in Spain, or the Chicago auto show while the user is driving through the state of Illinois. These should be suggested to the user by the software, depending on their popularity (as indicated by ratings, etc.) (5). A different marker on the map/list of points of interest should be used to distinguish these types of events. All of these "prediction algorithms" specified above have the single purpose of simplifying the process of road-travel planning for a user. The data needed for these are already available through third party sources today. The software could also allow the user to book hotels, etc., for the trip and save the confirmation information as a part of the trip itinerary. When suggesting hotels, rest stops, restaurants, etc., it must be mindful of the members of the trip as it could include pets or other members with special needs, like small children, disabled members, etc. (23). For instance, if the travelers are planning to spend a day at a museum where pets are not allowed, the software could suggest an affordable and highly rated pet day care near the museum or their hotel. Also, the rankings for suggestions for points of interest could be adjusted based on whether kids are a part of the group that is traveling. For instance, for a group with kids, an amusement park may be ranked higher in the tourist attractions vs. a group that doesn't have kids. Also, kid-friendly restaurants could get a better ranking in such scenarios. These adjustments can be done by maintaining a weightage for these attributes when sorting the points of interest results obtained by querying the software's own database or a third party.

In all the above modes, there is always a chance that the software doesn't accurately find what the user is looking for. To account for this, the user should always have an easily accessible option of planning the trip manually without assistance from the software. In this interface, the user should be allowed to manually search for points of interest based on category, name, hours of operation, etc. and should include all the types of points of interest/events specified above. In the manual mode, the user should be allowed to specify/draw an area of interest within which he/she would like to search for places of interest.

Once the user has planned a trip, he/she should be allowed to save it and view/modify it from any device after entering his/her credentials. The software running on the device should be able to detect that there is a saved trip for the current user, as identified by his/her credentials such as username/phone number, etc. and it should be able to match it with the current time and date with that of the saved trip to adjust the default interface presented to the user appropriately. In other words, if a stationary user has scheduled a trip starting earlier today (and lasting the whole day) and starts the software on their phone, the software should default to allowing the user to modify/continue the trip, whereas if no trip is scheduled, it would default to allow the user to plan a new trip.

The software could also allow the user to save a number of "frequently visited" locations and a history of destinations for quick access. These could be provided as categories of points of interest in the user interface.

The method to find places of interest along a route always requires an area to be specified. Once the area is specified using the methods described above, places could be searched for within them. These results could then be checked for redundancies, and compiled to provide a complete list of results along a route.

Note that although the above description assumes driving as the mode of transportation, the methodology could just as easily be applied to other modes of transportation as well, such as public transportation, walking, etc. However, there would be a few adjustments that would be needed for other transportation modes. For instance, in public transportation, a long trip could potentially be much longer than a normal long driving trip assuming high-speed rail, etc. while for walking it could be much shorter. There's also the possibility of mixed mode transportation, where multiple such modes would be used (bike to the closest train station, take the train to destination station where your car is parked and then take the car to the final destination, etc.). The determination of point of interest search area depends upon a number of factors, a major one being the mode of transportation used. When using public transportation, the determination of this area would likely be based on duration of travel, rather than distance traveled, and would depend on the time of departure as well since they are restricted by the public transportation schedules. This specifically highlights the concept of "real accessibility" vs. "cartesian distance" (lat-long distance) accessibility as the area is determined by what is truly accessible based on the roadways/public transit services that exist between the source and the destination rather than that based on a straight line Cartesian distance between two points on a map. For instance, if a user was driving on a mountain, per Cartesian distance there could be a lot of places accessible, but they may not really be accessible as the route to get there could take much longer to make it unreasonable. (1) (27)

When the mode of transportation is public transit, the area of interest to search for places can be calculated by focusing (within a walkable radius) around transit stations (bus stops, train stations, etc.) that are accessible within a certain time from the departing location. This can be done by utilizing Dijkstra's algorithm, RAPTOR algorithm or other such routing algorithms. This weightage of edges for public transportation is defined in the unit of time. Since we do not have a destination, the modified algorithm would stop once the next closest stop takes longer to get to than the specified threshold time (like 15 minutes since departing). For instance, the following implementation of Dijkstra's algorithm can be modified for this purpose by changing "dist" to "time" and by checking above line 13 that the time[u] is greater than threshold and breaking if so.

```
1  function Dijkstra(Graph, source):
2   for each vertex v in Graph: //Initializations
3     dist[v]:=infinity; //Unknown distance function from
4     //source to v
5     previous[v]:=undefined; //Previous node in optimal path
6   end for //from source
7
8   dist[source]:=0; //Distance from source to source
9   Q:=the set of all nodes in Graph; //All nodes in the graph are
10  //unoptimized—thus are in Q
11  while Q is not empty: //The main loop
12    u:=vertex in Q with smallest distance in dist[ ];
      //Source node in first case
13    remove u from Q;
14    if dist[u]=infinity:
15      break; //all remaining vertices are
16    end if //inaccessible from source
17
18    for each neighbor v of u: //where v has not yet been
19    //removed from Q.
20      alt:=dist[u]+dist_between(u, v);
21      if alt<dist[v]: //Relax (u,v,a)
22        dist[v]:=alt;
23        previous[v]:=u;
24        decrease-key v in Q; //Reorder v in the Queue
25      end if
26    end for
27  end while
28  return dist;
29 end function
```

The search would then focus around all the stops that resulted from this exploration of the graph, consolidate the results by removing redundant entries and sorting and filtering them based on various attributes (time to place, hours of operation, etc.). (27)

Processing Points of Interest:

After the software has found the points of interest for the user based on intelligent determination of the search area and before it presents them to the user, it has to process them to make sure they're meaningful and relevant to the user (3). Many techniques could be used to achieve this. The most efficient way would be to apply a process of elimination first and then sort the remainder of results appropriately.

There could be many parameters that could be applied in order to decide the elimination of a point of interest from the final list presented to the user (6). Some examples could include the following:

a. User's specified budget—For instance, it could be an expensive restaurant that is out of the user's budget
b. Time of day user arrives at the location coinciding with the place being closed—For instance, the software knows the user is arriving at Los Angeles at night, so it probably shouldn't show museums as an option
c. User interest being different—User is interested in Mexican food, but the place is Greek.

Once the list of results is trimmed to exclude irrelevant items, it needs to be sorted for relevance to the user using data such as user preferences, crowd preferences, etc. However, the various attributes would need to be normalized first as explained below. This would lead to an even accounting of all attributes.

Consider an example where the user is traveling by public transportation. Let's say Arrival times of results range from 1:20 PM→1:50 PM, so 3 minutes of arrival time is 1 point. Also, let's assume travel times of results range from 10 minutes→50 minutes, so 4 minutes of travel time is 1 point. Here is the analysis for two of the places in the results:

Place A—15 minutes away, arriving at 1:48 PM
Place B—45 minutes away, arriving at 1:40 PM
Arrival Time Normalization:
  Place A—1:48 PM=(1:48−1:20)/3=10
  Place B—1:40 PM=(1:40−1:20)/3=7
Travel Time Normalization:
  Place A—15 travel minutes=(15−10)/4=2
  Place B—45 travel minutes=(45−10)/4=9
Place A Normalized=10+2=12
Place B Normalized=7+9=16

Per the above calculation, place A is better. Note that in the above example, a lesser value is better. This could be reversed easily to match with other attributes such as ratings.

A numerical weight system could be applied to rank the results. The weights could be based on parameters such as accessibility (distance from route, public transportation coverage, etc.), cost (gas prices, restaurant price range, etc.), user preferences (E.g. User preference of Ethiopian food) and crowd preferences, such as aggregated ratings for the restaurants in the area of interest. The weights could be prioritized based on the importance of the parameter. For instance, user preference would have a higher weight than crowd ratings. In the above example, if we weighted travel time higher than the travel duration, we could reverse the results:

Place A—15 minutes away, arriving at 1:48 PM
Place B—45 minutes away, arriving at 1:40 PM
Arrival Time Normalization:
  Place A—1:48 PM=(1:48−1:20)/3=10
  Place B—1:40 PM=(1:40−1:20)/3=7
Travel Time Normalization:
  Place A—15 travel minutes=(15−10)/4=2
  Place B—45 travel minutes=(45−10)/4=9
Travel time weightage=0.25
Arrival time weightage=1
Place A Normalized=10*1+2*0.25=10.5
Place B Normalized=7*1+9*0.25=9.25

Now place B is better. Depending upon the mode of transportation and other use cases (planning, real-time, etc.) the weights for sorting by relevance could be determined and used when processing the results.

The user could also be provided the option to sort the results based on single properties, such as travel time or ratings.

By default, the time estimates for the itinerary/plan presented to the user and those provided for traveling to points of interest should account for traffic estimates based on historical and current data. They could also account for current road conditions, public transportation system conditions, etc. while calculating the route (25). Factors such as traffic, road conditions, etc. can be accounted for by using their severity as an additional weightage for the respective edge of the graph. This modified weightage of the edge would be used in the routing algorithm instead of the original "static" weightage of the edge, which is almost purely based on the speed limit and width of the road.

Displaying Points of Interest:

After the software has accumulated the points of interest and processed them, they need to be displayed to the user in an aesthetically pleasing and readable format (3). For displaying purposes, the trip could be broken down into multiple sections (for instance, every 4 miles of the trip could constitute a section) and each processed list item could be placed in order in these sections. Later these sectioned lists could be combined from closest to source/current location to the destination and presented to the user. This would allow accounting for the priority of the points of interest while also accounting for the distance from the source, making for a better ordering of the results. It is also important to distinguish results based on their purpose. As indicated before, when suggesting necessary stops to the user, one type of symbol must be used, while for lesser important stops, a different symbol must be used indicating this low priority. The visibility of these stops on a map matters greatly, especially when a group of places are found in clusters (7). The higher priority stops must use a more visible symbol and must be more easily accessible than the others. Moreover, when dealing with lower precision touch interfaces, it is important to make the results easier to access. For instance, when a number of places are found clustered in a small space, it can be hard to identify them individually. To resolve this, the places could be grouped and a list could be displayed as an overlay from a more accessible grouping marker that can overshadow the individual markers on the map in this area. See FIG. 6 below for an illustration of this scenario. Also, contextually relevant symbols must be used to indicate their purpose. For instance, for indicating locations with opportunities to save money/deals, a dollar sign may be used to append the previously used symbol.

FIG. 6: Consolidating clustered points of interest into a more accessible grouped point of interest When displaying the results as a list, the key factors for a user could be displayed, allowing the user to compare various points of interest based on these factors, which could include accessibility (how long it takes to get there via public transportation, driving, etc.), whether the place offers a deal, does it have a happy hour, and so on. The results could be sorted based on these factors so the user can prioritize what's more important to him/her and find the appropriate point of interest. It would be important to note here that while a place may be very accessible via driving, it may not be so when using public transportation. Therefore, allowing the user to sort via such factors would provide the user with a very clear comparison of the results. (27)

Support the User's Execution of the Trip:

Once the user has finished planning the trip, it is time for the user to experience/execute the travel. The software could provide navigation directions (through voice, screen instructions, etc.) to the user for the trip in order to execute it successfully. The software client could use its host device's GPS capabilities (if any) to detect the user's location and could reroute the user if he/she veers off path.

When planning, the user can specify if he/she is traveling alone or with others. If the user is traveling with others, the user could identify his/her companions on the software client using their usernames or phone numbers. The software client can communicate this information to the server, which in turn can then mark the trip as shared between the specified users, making its details (such as itinerary, route, etc.) visible to all its members. The users can also choose to create notes in the trip, including things like a packing list, which can be shared with all the members of the trip if needed. One such instance would be if a University was planning a trip for its students and wanted to indicate that the students must bring some essentials such as skiing equipment, etc. for the trip. The software clients for the respective members could synchronize this information with the server and all members of the trip could then see this information in their account through the software client running on their device. (22).

For longer road travels, it is likely that the users are looking for ways to spend time (18). The software could provide a reference for travel games that could be played without distracting the driver. It is also possible that the users have exited the range of their favorite radio stations. The software could provide a way to search for an appropriate radio station based on the type (talk, metal, rock, etc.) or popularity or other attributes like name (NPR), etc. If the user has been driving for a few hundred miles, it could suggest some rest stops for the user to take a break. Also, if the user doesn't have any gas stations scheduled in the itinerary in the immediate future after driving for a couple hundred miles, depending on the type of vehicle (if that information is available) or based on a general average mileage of cars, it could point out upcoming gas stations so that the user can fuel up. The information regarding radio stations available in an area, games, etc. is easily accessible through third party sources. The software server or client would just need to query this information through these sources and present it to the user. It could also build its own database of such information for reference.

Since the software is capable of being aware of the user's location through the course of the travel, it is able to detect certain scenarios when the user could be in need of assistance (10). For instance, if the user has stopped on a highway while there are no traffic incidents, it is likely that he/she needs to contact the authorities or his/her roadside assistance service as specified in the user profile. When such a scenario is detected the software could ask the user if he/she would like to do so. If the user agrees, the software could either 1) Lookup the number for the authorities in the immediate locality by querying its own database or a third party source, and/or 2) Dial the number for the user's roadside assistance service (this information would need to be available in the user's profile) if the user's device is capable of making phone calls. It could also have a database of numbers for authorities in each zip code and could call the appropriate number instead of just looking it up.

Another application of knowing the user's location through the course of travel is to notify the user of repercussions of unscheduled stops. For instance, if the user has had an accident, flat tire, health emergency, etc., it could cause a delay long enough for the previously planned restaurant visit in the itinerary to be missed. If the delay is long enough, it could cause many other changes in the remainder of the itinerary as well, such as hotel reservations, etc. When the software determines such scenarios, it could warn the user on the user interface and suggest alternate points of interest that closely match the original choices as much as possible (9). The user could also open up planning mode on his/her device and edit the trip for such incidents.

In the case that there is an incident that has happened on the user's route (such as an accident, etc.) that will affect the user (within proximity), the user could be notified of the situation and asked if he/she wants to reroute. The user could also be notified in the case that the software detects that he/she is driving much above the speed limit. Other news relevant to the user's current plan of travel could be conveyed to the user as well. For instance, if there are incidents of violence, etc. reported in an area that the user is scheduled to visit shortly (12). The information regarding accidents, crime, etc. in an area is available through third party sources. The software server or client would just need to query this information through these sources and present it to the user. It could also build its own database of such information for reference.

The user could also be notified about any upcoming bad roads, etc. and given the option to re-route (25). This information can be gathered via methods outlined later in the document. The server can then be queried for this information and it can be presented to the user by the client The software could also provide a service to the authorities by helping clear the road in emergency scenarios (11). For instance, the server for the software could be in communication with the authorities regarding emergency situations. The authorities could notify the software's server of the location of the emergency and the location of the emergency responders. Using its current location, the software could determine if the user is on the route of an emergency vehicle. It could then notify the user of the situation by voice or some other means and reroute him/her while the emergency responder is in transit, if necessary. The rerouting should try to find an alternate route to the destination that doesn't intersect with the routes of emergency responders. For implementing this, the graph edges corresponding to the roads that the emergency vehicles would be occupying can be temporarily decreased in weightage (making them less desirable) so the routing algorithms reroute the user through a different route.

With the user's permission, the software could also gather information about the condition of the roads, or public transportation systems, etc. either explicitly via user input, or automatically through any sensors built-in to the user's device. Since the device is being used for real-time routing guidance, it would already know the user's location during the trip, it could tag the location with any road condition data. This data could be used to alert users about road conditions (26). In order to gather this data automatically, the software would need to first determine the rest state of the device, such as a smartphone. Thereafter, the software could monitor data from the device's sensors such as a gyroscope and accelerometer, which come standard in most smartphones today. If quick movements of the device are sensed while it was previously stationary, it can be construed as a bump in the road. The severity of the bump would depend upon the magnitude of the movement and various discrete levels of the severity could be pre-decided to categorize the bumps. The severity of the bumps in addition to the data regarding the speed of the vehicle before and after the bump could be used to assess the bump's effect on traffic. The data from several users can be averaged to get an accurate picture about the condition of a street and the true validity of a bump. Constant monitoring from all users would also help determine if the bump has been fixed. As mentioned previously, this data can be used to further account for the true time taken for traversing a route. This methodology could also be applied to public transit condition (and other factors such as punctuality) detection and notification. Note that since this would require constant monitoring of the sensors, it could be a drain on the battery of the device being used. For this reason, this software feature could be adjusted to be active only if the device is being charged. A secondary advantage of having this condition in place is that most devices, when being charged in a vehicle are not being handled by a user, and would therefore lead to more accuracy in detecting bumps.

The software could also enable the user to share the trip and its real-time status with other individuals (17) that may or may not be involved in the trip. This could enable adults to oversee minors without being explicitly intrusive. It could also be used to coordinate travel between groups of people and multiple vehicles. For instance, if multiple groups of people are conducting a trip, the individuals within each vehicle could be identified and the status of each vehicle could be shown on the screen of all the participants with the help of individually identifiable markers. This could also allow for notifying the rest of the party if one or more of the groups/vehicles are in need of assistance or have halted for some reason, like to fuel up. The members could also account for the expenses of the trip and the software could calculate the resultant share and debt of each member in the trip. After the trip, the media (pictures, videos, etc.) from all the members could be consolidated and enjoyed later.

While the user is on the road, the software client would monitor other aspects of the trip as well. For instance, if the user entered the gas level for the vehicle before starting, it could keep track of how many miles remain before the user would require fueling. It could match this data with the upcoming gas stations on the route. There could be circumstances where there are no gas stations for many miles on the user's route and the vehicle may not be able to make it far enough to cross this stretch. The software client could inform the user of this situation and map the next available gas station (per the user's indicated brand preference or history). Similar alerts can be configured for other aspects such as food, rest, etc. (13).

If the user's device is a smartphone, there is a possibility that the user would lose network services during the trip. To account for this condition, the software could implement a failsafe mechanism. It could keep track of the route back to the source. It would do this by first keeping a cache of the directions for round trip travel, i.e. even if the user has only mapped one-way, it could keep track of the return directions as well. Secondly, it could periodically check for the availability of a network connection to the server. If it sees that the network is spotty, it could 1) Download the map (all zoom levels) for offline use by the user, and 2) Download road information from the server for the surrounding area to store temporarily for offline routing by the software client. Since the client wouldn't have access to a database of places, it can substitute that with allowing the user the ability to mark a spot on the map he/she would like to route to. The software can also keep track of the user's network accessibility in conjunction with the user's service provider (AT&T, Sprint, etc.) to be able to predict such situations earlier for future trips. It would do this by first checking the network provider through the software client. Thereafter, while the software client periodically queries for the network, it could maintain a log of which accesses were met with an acknowledgement from the servers and which weren't. Every time it would get access to the server, it would upload the data gathered since the last time it established a connection with the server. This data could be averaged across multiple users to average out any inconsistencies. The last location where a network connection was established can also be marked on the map for the user's reference. (28)

Allow the User to Share his/her Experiences:

The user's experiences can also be used for improving the suggestions/results provided by the software (19). It can also be used for cherishing the trip later. For instance, when the software navigates a user to a Chevron gas station, the user could be prompted in a minimally invasive manner to add Chevron as a preferred brand and the location as the preferred gas station. For instance, this could be done with a timed dialog box which disappears after giving the user a few seconds to respond. Once this data is available, the prompts could be made much more subtle or removed altogether to avoid hampering the experience. In another example, if the user is routed to a restaurant, he/she could be prompted for a short review/rating of the restaurant in a minimally invasive manner. This data could be used to adjust the rankings/weightage of similar future suggestions made to the user and other users of the software.

It is inherent to humans to share. We especially cherish our travel experiences and love to talk about it. The users of the software should be allowed to share their experiences for this purpose (20). For instance, if we consider a smartphone user driving from San Jose, Calif. to Austin, Tex. for unofficial purposes, it is likely that the user would take some pictures along the way. Also, most smartphones today embed location data within the pictures. Even if location data was not embedded into the pictures, the timestamps of the pictures can be matched with the user's location at the time to get this information. Since the travel planning and execution software is aware of the dates the user was traveling, it could easily import the pictures that correspond to the trip and overlay them on a map with the route corresponding to the locations that they were taken. The software could then generate a storyboard for the trip, which would provide an organized form of looking at the media. If multiple members were on the trip together, their pictures could be consolidated and an individual and consolidated storyboard could be created for each member and for the collective group respectively. Based on the privacy settings of the user, these experiences could be shared with the outside world and others could be encouraged to make such trips. Also, based on the privacy settings of the user, anonymous data could be collected for the users' experiences and could be used to improve the overall engine for planning future trips for other users as well.

Learn from the User's Experiences:

The data captured from the user's experiences could be used for deciding the weights of search results for the user and others in the future (21). As mentioned above, one example is capturing and quantifying a user's experience at a point of interest like a restaurant. This quantized experience, when combined and aggregated with other users' experiences would provide supplementary information, in addition to existing crowd sourced ratings, for adjustments that need to be made for weighing the ranking of such a restaurant. For instance, if one user had a bad experience at a restaurant, the ranking for this restaurant should be reduced next time that user searches for restaurants in that category. If multiple users are seen to have a bad experience at a restaurant, then this information should be collected and added onto the pre-existing data so that in the future other users could avoid having a bad experience at the restaurant in question. The vice versa must be done too, i.e. in the case that individuals had good experiences at a restaurant, it must go up in ranking in the individuals and global search results as appropriate. This constant feedback loop would create self-sustaining software that is up-to-date and can provide informed suggestions/results.

Common destinations, routes, etc. could also be gathered and suggested to new users as popular trips, which would save them time in organizing them. In an ideal scenario, the software would have all the data it needs to perfectly predict the places of interest that the user would be interested in and it could create whole itineraries for the trip based on limited explicit user input simply by accounting for the user's historical activity and the suggestion from global sources (ratings, etc.). There could also be a "explore" mode where the user requests the system to suggest a destination and an entire trip accounting for his/her current location as the starting point and the current time as the starting time. A recommendation engine in the software's server would suggest this trip based on the "nature" of the user as characterized by his/her history of planning trips with the software and of the changing trends as indicated by other users globally. As a result, the user with the single touch of a real/virtual button could plan such a trip (24).

The Present Disclosure Teaches the Following Elements:
1. It automatically determines and dynamically adjusts the point of interest search area per the motion and position of the user.
2. It doesn't require a final destination to search for points of interest along the currently used street within an accessible distance.
3. It intelligently aggregates and presents the information required for road-travel planning to the user. This leads to a great user experience, as the user doesn't have to sift through the data manually for it to make sense.
4. It accounts for the user's and the crowd's preferences when presenting points of interest for the user to consider.
5. It accounts for volatile events when searching for points of interest, including but not limited to festivals, parades, etc.
6. It accounts for eliminating factors when presenting users with choices for points of interest, including but not limited to time of day, point of interest hours of operation, budget, traffic, user interests, crowd based reviews, pets, etc.
7. It is mindful of the readability of the points of interest when presented to the user.
8. It perceives the difference in implied user scenario when the user is utilizing a specific type of device to access the travel planning service, including but not limited to phones, tablets, watches, desktop computers, laptop computers, etc. It also accounts for the correlation between the motion of the device and the type of road-travel—planned vs. real-time.
9. It suggests alternative points of interest in the event of an adverse incident that causes a disruption the trip itinerary, including but not limited to accidents, flat tires, vehicular break-downs, health emergencies, etc.
10. It detects conditions that could imply the user is in need of assistance (like stopped on a highway when not much traffic, etc.) to suggest contacting their individual roadside assistance service or emergency response services.
11. It enables emergency response services to communicate a path to a distress site in order to allow the technology to determine and subsequently alert the user that they may be in the path of an emergency responder and possibly reroute him/her away from it while the emergency responder is in transit.
12. It alerts the user with necessary and relevant information, including but not limited to news alerts, accident alerts, speed limit changes, etc. It also provides suggestions for actions that can be taken as a result.
13. It uses prediction algorithms on a real-time basis to determine a user's need during the travel (based on duration of non-stop driving, temperature, terrain, number of drivers, etc.), including but not limited to food, gas, rest, etc.
14. It uses prediction algorithms and available user data at a trip planning time to predict points of interest around the right location (based on travel time accounting for traffic, etc.), including but not limited to hotels to rest for the night, etc. It would also allow users to book reservations for hotels, etc. through the same portal.
15. It uses prediction algorithms and available user data in order to predict savings opportunities for a user during travel including, but not limited to fuel prices, deals, Hotel prices, etc.

16. It provides a "most efficient route" to the user when the destination is known and the intermediate points of interest are chosen for the trip.
17. It allows for multiple users (including ones not traveling) to be a part of a single trip plan in order to allow adult oversight and/or individually coordinate groups of travelers, including but not limited to managing their routes independently, allowing for communication of members' locations, accounting for costs, etc.
18. It provides suggestions for entertainment, including but not limited to allowing to search for frequencies of their favorite radio stations/genres in their current location, providing a travel-game reference, etc.
19. It provides a medium to promptly obtain the users' feedback from an activity with an efficient, minimally invasive user interface.
20. It provides a medium for the user to capture and share their experiences from the road-travel in a contextually and geographically aware manner.
21. It learns from its users' experiences in order to improve their points of interest suggestions.
22. It provides a seamlessly integrated road-travel planning service that minimizes the user's effort in planning a road trip, including but not limited to creating a checklist of items to pack for the road trip, booking hotels, rental cars, etc.
23. It accounts for special needs of some of the members in the trip, including but not limited to disabled members, small children, pets, etc.
24. It provides an option to plan an entire trip with a single touch of a real/virtual button.
25. It accounts for external conditions that the users might encounter, such as bad roads, public transportation conditions, etc. when routing the user
26. It provides a mechanism to assimilate information about the conditions of the roadways, public transportation system, etc. in a non-invasive manner.
27. It accounts for the real accessibility of the point of interest when filtering results after searching around a location.
28. It provides a predictive and smart caching mechanism which makes it able to route a user even if the user doesn't have access to the app's server/routing engine.

It could be applicable to other modes of transportation, including but not limited to self-driving cars, public transportation, walking, cycling, etc.

Those skilled in the art will appreciate that the present teachings may be practiced with other system configurations, including hand-held devices, multiprocessor systems, microprocessor-based or programmable consumer electronics, network PC's, minicomputers, mainframe computers, and the like. The present teachings may also be practiced in distributed computing environments where tasks are performed by remote processing devices that are linked through a communications network. In a distributed computing environment, program modules may be located in both local and remote memory storage devices.

The computer described herein above may operate in a networked environment using logical connections to one or more remote computers. These logical connections can be achieved using a communication device that is coupled to or be a part of the computer; the present teachings are not limited to a particular type of communications device. The remote computer may be another computer, a server, a router, a network PC, a client, a peer device or other common network node, and typically includes many or all of the elements described above relative to the computer. The logical connections include a local-area network (LAN) and a wide-area network (WAN). Such networking environments are commonplace in office networks, enterprise-wide computer networks, intranets and the Internet, which are all types of networks.

When used in a LAN-networking environment, the computer is connected to the local network through a network interface or adapter, which is one type of communications device. When used in a WAN-networking environment, the computer typically includes a modem, a type of communications device, or any other type of communications device for establishing communications over the wide area network, such as the Internet.

The foregoing description illustrates exemplary implementations, and novel features, of aspects of an apparatus and method for providing a predictive travel planning system. Alternative implementations are suggested, but it is impractical to list all alternative implementations of the present teachings. Therefore, the scope of the presented disclosure should be determined only by reference to the appended claims, and should not be limited by features illustrated in the foregoing description except insofar as such limitation is recited in an appended claim.

While the above description has pointed out novel features of the present disclosure as applied to various embodiments, the skilled person will understand that various omissions, substitutions, permutations, and changes in the form and details of the present teachings illustrated may be made without departing from the scope of the present teachings.

Each practical and novel combination of the elements and alternatives described hereinabove, and each practical combination of equivalents to such elements, is contemplated as an embodiment of the present teachings. Because many more element combinations are contemplated as embodiments of the present teachings than can reasonably be explicitly enumerated herein, the scope of the present teachings is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art. Furthermore, to the extent that the term "includes" is used in either the detailed description or the claims, such term is intended to be inclusive in a manner similar to the term "comprising".

What is claimed is:

1. A system used by a user, comprising:
  a.) an information acquisition device, executes at least a portion of a computer readable code stored on a computer readable medium, acquires at least one indicator of user intent information, acquires at least one point of interest information;
  b.) an initial area of interest, specified by the user or around a start position;
  c.) a dynamic area of interest, centered about a dynamic route position, along the user's intended or projected route, wherein inside the dynamic area of interest the at least one point of interest information is collected by the information acquisition device, and;

d.) a processor, adapted to execute the computer readable code, processing the at least one point of interest information available inside the initial area of interest, and furthermore inside the dynamic area of interest, the acquired at least one indicator of user intent information, outputs at least one suggestion of accessible point of interest information.

2. The system of claim 1, wherein the at least one accessible point of interest information is selected from the group comprising a location and an activity.

3. The system of claim 2, wherein the information acquisition device is a computing device selected from the group comprising a laptop, a desktop, a tablet, a mobile phone, a smart car, or a watch.

4. The system of claim 3, wherein the information acquisition device calculates a speed and a direction, wherein the processor executes computer readable code to process an updated the at least one point of accessible information associated with an updated dynamic area of interest with the acquired at least one indicator of user intent information.

5. The system of claim 4, wherein the acquired at least one indicator of user intent information is characterized as explicit.

6. The system of claim 5, wherein the acquired at least one indicator of user intent information characterized as explicit comprises information manually entered by the user.

7. The system of claim 4, wherein the acquired at least one indicator of user intent information is characterized as implicit.

8. The system of claim 7, wherein the acquired at least one indicator of user intent information characterized as implicit is acquired from a type of device or a user location.

9. The system of claim 8, further comprising an audio/visual presentation of the at least one suggestion, wherein the user may manually select the at least one suggestion.

10. The system of claim 9, wherein the processor is disposed on a remote server in operative communication with a client processor disposed on the information acquisition device.

11. The system of claim 10, wherein the at least one suggestion comprises navigation instructions to a target location, wherein the target location is selected from the at least one point of accessible point of interest information, stored on a non-transitory computer readable medium.

12. The system of claim 11, communicating a relevant quantity of information to at least one other information acquisition device.

13. The system of claim 12, wherein the relevant quantity of information is selected from the group consisting of: information that is needed for the system to calculate the suggestions for places, or information that is needed for the system to determine the current state of a user's trip, or information related to location, bearing, acceleration, environmental measurements and inputs from various other sensors on any device the user could be using, or information about the user's interaction with the device/client software.

14. The system of claim 11, providing an alert or notification, responsive to a multitude of situations, selected from the group consisting of:
   a) user is obstructing the intended path of an emergency vehicle;
   b) there are incidents along the user's intended route that would affect his/her journey, such as accidents, weather changes or other adverse incidents;
   c) impending loss of mobile network;
   d) unavailability of resources such as food, rest stops, gas stations for a long stretch;
   e) worse than expected road conditions coming up;
   f) if unscheduled stops or delay at scheduled stops are affecting the rest of the trip;
   g) user is driving above the speed limit;
   h) accident/crime/news reports relevant to the user in situations such as violence reports in the hotel the user has a reservation in;
   i) public transit delays;
   j) situations indicating the user is in need of assistance, for instance when it detects the user has stopped on a highway when there is no traffic;
   k) other vehicle(s) included within the trip need assistance;
   l) request to specify user preferences and ratings, for example rating a restaurant the user just visited and specifying brand preference of a gas station;
   m) new points of interest were found that might make a good addition to the trip;
   n) radio station boundary exited and different station needs to be tuned to for the genre.

* * * * *